US012766403B2

(12) United States Patent
Conrad

(10) Patent No.: US 12,766,403 B2
(45) Date of Patent: Oct. 20, 2026

(54) STEERING WHEEL BASE FOR GAMING APPLICATIONS

(71) Applicant: CORSAIR MEMORY, INC., Milpitas, CA (US)

(72) Inventor: Bernhard Conrad, Buch am Erlbach (DE)

(73) Assignee: CORSAIR MEMORY, INC., Milpitas, CA (US)

( * ) Notice: Subject to any disclaimer, the term of this patent is extended or adjusted under 35 U.S.C. 154(b) by 209 days.

(21) Appl. No.: 18/826,703

(22) Filed: Sep. 6, 2024

(65) Prior Publication Data

US 2025/0083036 A1 Mar. 13, 2025

(30) Foreign Application Priority Data

Sep. 7, 2023 (EP) .................................... 23195995

(51) Int. Cl.
*A63F 13/245* (2014.01)

(52) U.S. Cl.
CPC .... *A63F 13/245* (2014.09); *A63F 2300/1043* (2013.01)

(58) Field of Classification Search
CPC ............................ A63F 13/245; A63F 13/803
See application file for complete search history.

(56) References Cited

U.S. PATENT DOCUMENTS 4,659,244 A 4/1987 Malvy
4,660,671 A * 4/1987 Behr .................... B62D 5/0463 180/404
4,825,157 A * 4/1989 Mikan .................... G05G 9/047 324/207.16

(Continued)

FOREIGN PATENT DOCUMENTS

CA 2358518 A1 7/2000
CN 114 534 245 A 5/2022

(Continued)

OTHER PUBLICATIONS

Office Action From Japanese Patent Office Dated Mar. 3, 2026 Issued for Corresponding Japanese Patent Application.

(Continued)

*Primary Examiner* — Chase E Leichliter
(74) *Attorney, Agent, or Firm* — Harvest IP Law, LLP

(57) ABSTRACT

A steering wheel base is provided for gaming applications and includes a steering wheel shaft, an attachment component, which is fixed to the steering wheel shaft to rotate with the steering wheel shaft and that is configured such that the steering wheel base is directly electrically connectable to electronics of a steering wheel via an electric plug-in contact of the attachment component, and a system including a first mechanical quick coupling element and a second mechanical quick coupling element, which are interchangeably fixable to the attachment component into a fixed position and are adapted for different steering wheel side coupling elements of the steering wheel to provide mechanical quick coupling between the steering wheel base and the steering wheel. A full system including a steering wheel and a steering wheel base, and a method of connecting a steering wheel to a steering wheel base are also provided.

12 Claims, 2 Drawing Sheets

(56) References Cited

U.S. PATENT DOCUMENTS

| | | | | |
|---|---|---|---|---|
| 5,113,714 | A * | 5/1992 | Eklund | G05G 9/04788 248/65 |
| 5,160,918 | A * | 11/1992 | Saposnik | G05G 9/047 345/161 |
| 5,656,901 | A * | 8/1997 | Kurita | A63F 13/803 434/45 |
| 5,727,188 | A * | 3/1998 | Hayes | A63F 13/245 434/45 |
| 5,823,876 | A * | 10/1998 | Unbehand | A63F 13/285 463/37 |
| 5,829,745 | A * | 11/1998 | Houle | A63F 13/24 463/47 |
| 5,868,573 | A * | 2/1999 | Kerby | A63F 13/245 434/62 |
| 5,969,520 | A * | 10/1999 | Schottler | G05G 9/047 324/207.2 |
| 5,989,123 | A * | 11/1999 | Tosaki | A63F 13/803 463/47 |
| 6,020,875 | A * | 2/2000 | Moore | A63F 13/428 345/157 |
| 6,050,897 | A * | 4/2000 | Suzuki | A63F 13/245 463/37 |
| 6,159,099 | A * | 12/2000 | Chen | A63F 13/245 463/6 |
| 6,203,432 | B1 * | 3/2001 | Roberts | A63F 13/803 463/36 |
| 6,283,859 | B1 * | 9/2001 | Carlson | G06F 3/016 463/36 |
| 6,480,183 | B1 * | 11/2002 | Van Ruymbeke | G05G 9/047 324/660 |
| 6,573,709 | B1 * | 6/2003 | Gandel | G01B 7/02 324/207.2 |
| 6,909,353 | B2 * | 6/2005 | Romero Herrera | G05G 9/047 338/12 |
| 7,775,884 | B1 * | 8/2010 | McCauley | A63F 13/335 463/39 |
| 8,920,240 | B2 * | 12/2014 | Jaouen | A63F 13/245 463/47 |
| 9,884,250 | B2 * | 2/2018 | Jaouen | A63F 13/245 |
| 10,039,973 | B2 * | 8/2018 | Osawa | A63F 13/00 |
| 10,716,999 | B2 * | 7/2020 | Jaouen | A63F 13/803 |
| 10,843,562 | B2 * | 11/2020 | Goulet | B62D 15/022 |
| 11,442,489 | B2 * | 9/2022 | Bonnici | G05G 9/047 |
| 2001/0052893 | A1 * | 12/2001 | Jolly | G06F 3/0338 345/156 |
| 2002/0128064 | A1 * | 9/2002 | Sobota | A63F 13/245 463/37 |
| 2003/0067111 | A1 * | 4/2003 | Swan | A63F 13/98 463/36 |
| 2003/0137394 | A1 * | 7/2003 | Romero Herrera | H01C 10/103 338/128 |
| 2004/0104887 | A1 * | 6/2004 | Tsukamoto | G06F 3/016 345/156 |
| 2005/0009605 | A1 * | 1/2005 | Rosenberg | A63F 13/42 463/36 |
| 2005/0255918 | A1 * | 11/2005 | Riggs | A47C 3/16 463/37 |
| 2006/0197741 | A1 * | 9/2006 | Biggadike | G05G 5/03 345/156 |
| 2007/0077783 | A1 * | 4/2007 | Becker | B60R 16/027 324/207.2 |
| 2007/0262959 | A1 * | 11/2007 | Gu | G05G 9/047 345/161 |
| 2008/0140340 | A1 * | 6/2008 | Barthomeuf | B62D 15/0235 702/151 |
| 2008/0297328 | A1 * | 12/2008 | Crawford | A63F 13/285 340/407.2 |
| 2009/0122006 | A1 * | 5/2009 | Nielsen | A63F 13/358 345/156 |
| 2010/0044144 | A1 * | 2/2010 | Tajima | B62D 5/0427 180/443 |
| 2010/0048308 | A1 * | 2/2010 | Lee | A63F 13/803 463/47 |
| 2010/0163333 | A1 * | 7/2010 | Patil | B62D 15/0245 180/402 |
| 2010/0173711 | A1 * | 7/2010 | Jaouen | G05G 9/047 29/592.1 |
| 2011/0256930 | A1 * | 10/2011 | Jaouen | A63F 13/803 463/37 |
| 2011/0272880 | A1 * | 11/2011 | Markowitz | G09B 9/06 273/148 B |
| 2011/0281649 | A1 * | 11/2011 | Jaouen | A63F 13/803 463/36 |
| 2014/0094310 | A1 * | 4/2014 | Bleich | G07F 17/3209 463/38 |
| 2015/0119145 | A1 * | 4/2015 | Jaouen | A63F 13/245 463/37 |
| 2018/0272233 | A1 * | 9/2018 | Jaouen | A63F 13/803 |
| 2018/0356854 | A1 * | 12/2018 | Spiteri | G01D 5/26 |
| 2020/0269130 | A1 * | 8/2020 | Provancher | A63F 13/24 |
| 2022/0342438 | A1 * | 10/2022 | Yu | G05G 9/047 |
| 2023/0145334 | A1 * | 5/2023 | Eriksen | G09B 9/02 434/62 |
| 2024/0075978 | A1 * | 3/2024 | Conrad | H01R 13/631 |
| 2024/0286547 | A1 * | 8/2024 | Oun | B60Q 5/003 |
| 2025/0083036 | A1 * | 3/2025 | Conrad | A63F 13/245 |

FOREIGN PATENT DOCUMENTS

| | | | |
|---|---|---|---|
| CN | 115140151 | A | 10/2022 |
| EP | 1 201 276 | A2 | 5/2002 |
| EP | 2377587 | A1 | 10/2011 |
| JP | 60-255546 | A | 12/1985 |
| JP | 2002-178933 | A | 6/2002 |
| JP | 2003-118539 | A | 4/2003 |
| JP | 2003-212130 | A | 7/2003 |
| JP | 2005-032245 | A | 2/2005 |
| JP | 2009-103796 | A | 5/2009 |
| JP | 2009-197874 | A | 9/2009 |
| JP | 3215479 | U | 3/2018 |
| JP | 2019-119411 | A | 7/2019 |
| WO | 2006-088182 | A1 | 8/2006 |

OTHER PUBLICATIONS

Office Action From Japanese Patent Office Dated Nov. 12, 2025, Issued for Japanese Patent Application No. 2024-152321.

Extended European Search Report dated Feb. 8, 2024, in EP 23195995.8.

* cited by examiner

STEERING WHEEL BASE FOR GAMING APPLICATIONS

TECHNICAL FIELD OF THE INVENTION

The present invention relates to steering wheel bases for gaming applications, and to systems and methods for attaching steering wheels to bases for gaming applications.

BACKGROUND OF THE INVENTION

A steering wheel base is used to simulate steering behavior for gaming applications, like automobile race simulations or similar applications. Therefor it comprises a steering wheel shaft that is connectable to a steering wheel, wherein the steering wheel base is configured to direct simulated forces to the steering wheel shaft and thus to the steering wheel and, at the same time, to read the steering movement of the steering wheel and thus of the steering wheel shaft and to transmit this to the gaming application. In addition the wheel base is connected to the electronics of the steering wheel. To attach the steering wheel to the wheel base, a quick coupling system is used with elements on the side of the wheel base and the steering wheel.

A steering wheel base with such a quick coupling system is known from European Publication No. EP 4 041 615 A. It ensures that the steering wheel is attachable to the steering wheel base only in the correct orientation. This improves the simplicity and property of the connection between the steering wheel base and the steering wheel. However, the versatility of using such a steering wheel base is limited.

SUMMARY OF THE INVENTION

It is therefore the object of the present invention to provide a steering wheel base with improved versatility of use.

A solution of the object is provided with a steering wheel base according to one embodiment of the invention. A steering wheel base for gaming applications comprises a steering wheel shaft, an attachment component, which is fixed to the steering wheel shaft to rotate with the steering wheel shaft and that is configured such that the steering wheel base is directly electrically connectable to electronics of a steering wheel via an electric plug-in contact of the attachment component, and a system comprising a first mechanical quick coupling element and a second mechanical quick coupling element, wherein the first mechanical quick coupling element and the second mechanical quick coupling element are interchangeably fixable to the attachment component into a fixed position and are adapted for different steering wheel side coupling elements of the steering wheel to provide mechanical quick coupling between the steering wheel base and the steering wheel.

The steering wheel base makes it possible that steering wheels with different wheel side coupling elements can be coupled to the steering wheel base in an advantageous and simple way. This improves the versatility of the usability of the steering wheel base.

Further, the port to the electronics of the steering wheel is similar for several steering wheels. Accordingly, it is advantageous that the electric plug-in contact of the steering wheel base is part of the attachment component, which is not interchangeably, as the user does not have to disconnect any internal electronic connections when adapting the steering wheel base for a different steering wheel. The first mechanical quick coupling element and the second mechanical quick coupling element are purely mechanical components that can also be interchanged by amateur users in a quick and efficient way.

Advantageous embodiments of the present invention are the subject of the dependent claims.

According to a particularly preferred embodiment, the attachment component comprises a first engagement element and the first mechanical quick coupling element and the second mechanical quick coupling element each comprise a second engagement element, wherein the first mechanical quick coupling element and the second mechanical quick coupling element are only fixable to the attachment component in the fixed position, when the first engagement element engages the second engagement element. This ensures the orientation of the first mechanical quick coupling element and the second mechanical quick coupling element with respect to the steering wheel base in the fixed position. Preferably, the first engagement element is formed as a projection and the second engagement element is formed as a groove or vice versa. In this way the engagement elements can be designed in a simple way.

According to a preferred embodiment, the attachment component comprises a protrusion, which extents in line with an axial direction of the steering wheel shaft, wherein the electric plug-in contact is arranged at an end of the protrusion distant to the steering wheel shaft and a contact closure direction of the electric plug-in contact is in line with the axial direction of the steering wheel shaft. This means that the electric plug-in contact projects towards the steering wheel and can thus be easily connected to the steering wheel's electronics.

In a particularly preferred embodiment, the first mechanical quick coupling element and the second mechanical quick coupling element each comprise a sleeve part forming a cavity having two opposite openings, a first opening and a second opening, wherein the protrusion of the attachment component is configured such that the protrusion is insertable into the cavity through the first opening and wherein the electric plug-in contact is accessible from the second opening to electrically connect the electronics of the steering wheel to the electric plug-in contact, wherein preferably the cavities of the respective mechanical quick coupling element are shaped differently. This allows a very compact design of the steering wheel base.

According to a preferred embodiment, the sleeve part of the first mechanical quick coupling element and/or the second mechanical quick coupling element is formed with a chamfer at its second opening. This facilitates the coupling of the steering wheel to the steering wheel base.

In another preferred embodiment, the sleeve part of the first mechanical quick coupling element and/or the second mechanical quick coupling element is formed with a contour widening from the first opening in axial direction. This further facilitates the coupling of the steering wheel to the steering wheel base.

In a preferred embodiment, a plane of the second opening is perpendicular to the closure direction of the electric plug-in contact, wherein the electric plug-in contact is a maximum of 5 cm from the plane of the second opening. This makes the electrical plug-in contact particularly accessible from the second opening.

According to another preferred embodiment, the sleeve part of the respective first mechanical quick coupling element and the second mechanical quick coupling element is configured such that the electronics of the steering wheel are aligned with respect to the electric plug-in contact of the attachment component by the geometry of sleeve part of the first mechanical quick coupling element and the second mechanical quick coupling element, when the steering wheel with its respective steering wheel side coupling element is moved onto the first mechanical quick coupling element or the second mechanical quick coupling element to couple the steering wheel to the steering wheel base. This facilitates the connection of the electric plug-in contact and the electronics of the steering wheel.

In another preferred embodiment, the outer periphery of a portion of the protrusion, preferably of the electric plug-in contact, is shaped such that the first mechanical quick coupling element and/or the second mechanical quick coupling element can be inserted onto the protrusion only in a specific orientation. This ensures that the first mechanical quick coupling element and/or the second mechanical quick coupling element are fixed to the attachment component in the right orientation.

According to a preferred embodiment, the protrusion comprises at least one snap-fitting element, preferably two at opposite positions, at its sheath surface, which is configured to engage with a counterpart on the sleeve part of the first mechanical quick coupling element and/or the second mechanical quick coupling element. This allows the first mechanical quick coupling element and/or the second mechanical quick coupling element to be fixed to the attachment component in a simple and non-laborious way. Preferably, the counter part of the sleeve part is configured as an opening accessible from the outside of the sleeve part. This facilitates the release of the snap-fitting connection between the at least one snap-fitting element and the counterpart.

According to another preferred embodiment, the protrusion comprises a threaded hole in its sheet at its sheath surface, which is configured such that a fastener is screwable into the threaded hole through an opening leading into the cavity in an outer wall of the first mechanical quick coupling element and/or the second mechanical quick coupling element to secure the first mechanical quick coupling element and/or the second mechanical quick coupling element in the fixed position in a specific orientation. This also allows the first mechanical quick coupling element and/or the second mechanical quick coupling element to be fixed to the attachment component in a simple and non-laborious way.

In particularly preferred embodiment, the first mechanical quick coupling element and the second mechanical quick coupling element each comprise coupling engagement elements on an outside of the sleeve part that serve to mechanically quick couple the steering wheel side coupling elements of the steering wheel to the steering wheel base. Preferably, the coupling engagement elements are formed as indentations or slots into which steering wheel side counterparts of the steering wheel side coupling elements can engage to mechanically, especially rotationally, fix the steering wheel to the steering wheel shaft of the steering wheel base.

In another preferred embodiment, the sleeve part of the respective first mechanical quick coupling element and second mechanical quick coupling element is configured such that the steering wheel side coupling element of the steering wheel is only couplable to the steering wheel base in a defined orientation. This simplifies the correct fixation of the steering wheel to the Steering wheel base. Preferably, an outer contour of the sleeve part of the respective first mechanical quick coupling element and/or second mechanical quick coupling element is formed in such a way, that the steering wheel side coupling element of the steering wheel is only couplable to the steering wheel base in a defined orientation, wherein the outer contour is preferably axis symmetrical to the defined orientation and is not point-symmetric. In another preferred embodiment, the sleeve part of the respective first mechanical quick coupling element and/or second mechanical quick coupling element comprises a groove on its outer surface that extends parallel to the axial direction of the steering wheel shaft, wherein an inside of the steering wheel side coupling element of the steering wheel comprises a tongue element that engages with the groove in such a way that the steering wheel is only couplable to the steering wheel in the defined orientation.

According to another preferred embodiment, the attachment component comprises a first flange disc, which preferably is arranged symmetrically around and at an end of the protrusion, preferably distant to the electric plug-in contact, and the first mechanical quick coupling element and the second mechanical quick coupling element each comprise a second flange disc, which is preferably arranged symmetrically around and at an end of the sleeve part of the first mechanical quick coupling element and the second mechanical quick coupling element, preferably at the first opening, wherein the first flange disc and second flange disc are configured such that the two flange discs are connectable by screws, wherein preferably the first flange disc comprises threaded holes and the second flange disc comprises corresponding holes such that the second flange disc is fixable to the first flange disc by screws that are inserted through the corresponding holes and screwed into the threaded holes.

In another particularly preferred embodiment, the system comprises at least one other mechanical quick coupling element. This can additionally increase the variability with regard to the couplable steering wheels.

The invention further relates to a mechanical quick coupling element for a steering wheel base according to one of the above described embodiments.

The invention further relates to a full system comprising a steering wheel base for gaming applications according to one of the abovementioned embodiments and a steering wheel with a steering wheel side coupling element, wherein a fitting mechanical quick coupling element of the system in regard to the steering wheel side coupling element is fixed to the attachment component and the steering wheel is mechanically quick coupled to the steering wheel base.

Further, the invention relates to a method of connecting a steering wheel with a steering wheel side coupling element to a steering wheel base according one of the abovementioned embodiments comprising the following steps in that order:

- fixing a fitting mechanical quick coupling element of the system in regard to the steering wheel side coupling element of the steering wheel to the attachment component,
- moving the steering wheel side coupling element onto the fitting mechanical quick coupling element, such that an electrical connection between electronics of a steering wheel and the electric plug-in contact of the attachment component is formed and such that a mechanical quick coupling connection between the fitting mechanical quick coupling element and the steering wheel side coupling element is formed.

By this method a steering wheel can be easily and conveniently fixed to the steering wheel base, wherein through the possibility of selecting a fitting mechanical quick coupling element the range of couplable steering wheels is improved and thereby the versatility of use of the steering wheel base is increased.

In a preferred embodiment of the method, the method comprises the following steps in this order before the abovementioned steps:

removing another steering wheel with another steering wheel side coupling element from another fitting mechanical quick coupling element of the system in regard to the other steering wheel side coupling element, such that the electrical connection between the electronics of the other steering wheel and the mechanical quick coupling connection between the other fitting mechanical quick coupling element and the other steering wheel side coupling element are disconnected, detaching and removing of the other fitting mechanical quick coupling element of the attachment component.

Thereby the steering wheel base can be easily adapted to another steering wheel with another steering wheel side coupling element.

BRIEF DESCRIPTION OF THE DRAWINGS

In the following, identical parts are designated by identical reference signs. If a figure contains reference signs which are not dealt with in detail in the associated figure description, reference is made to preceding or subsequent figure descriptions.

DESCRIPTION OF REPRESENTATIVE EMBODIMENTS

Figure 1:
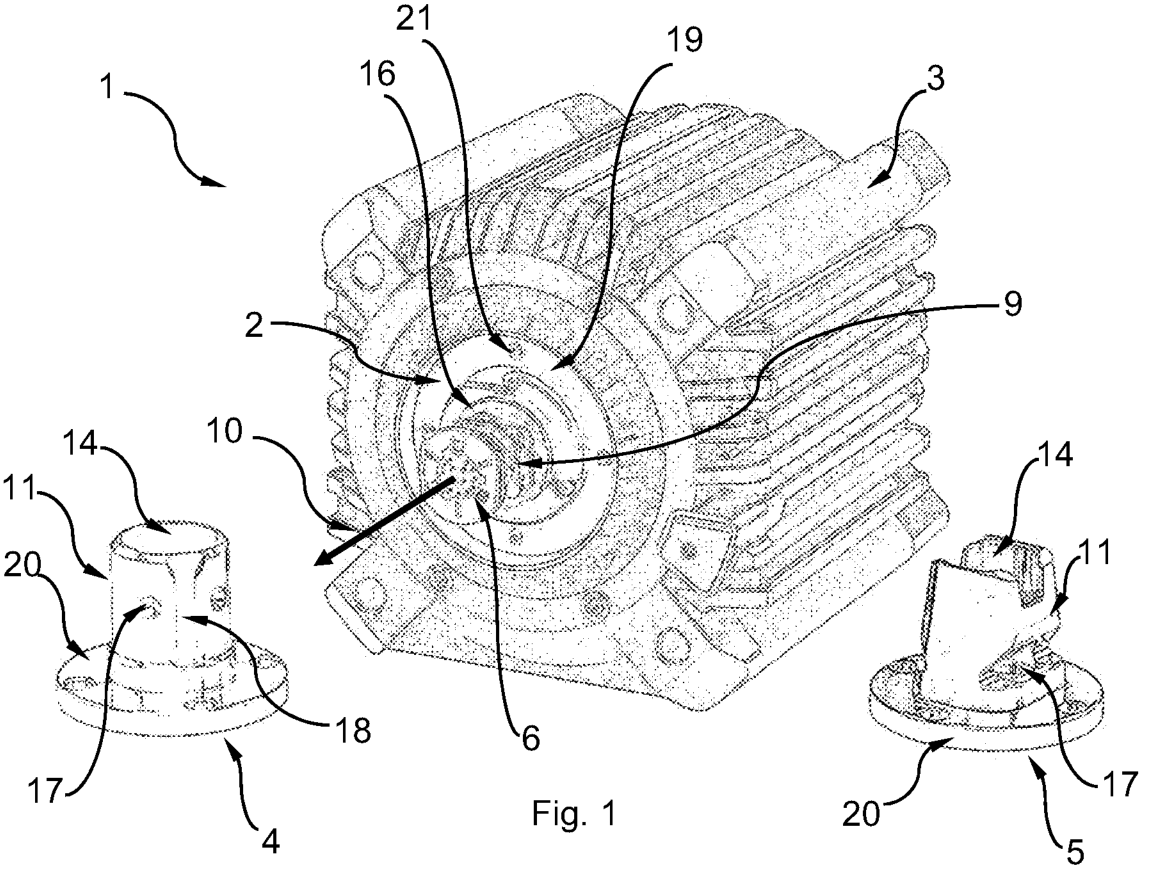
FIG. 1 shows a perspective view on an embodiment of the steering wheel base according to the invention.
Figure 2:
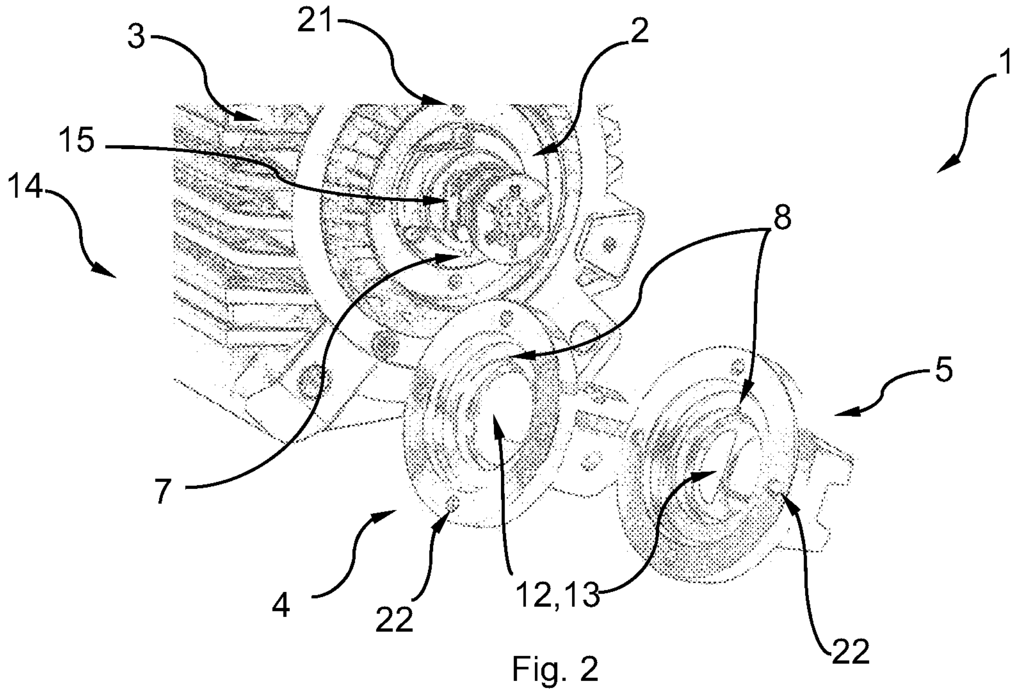
FIG. 2 shows a different perspective view on the embodiment of the steering wheel base according to FIG. 1.
Figure 3:
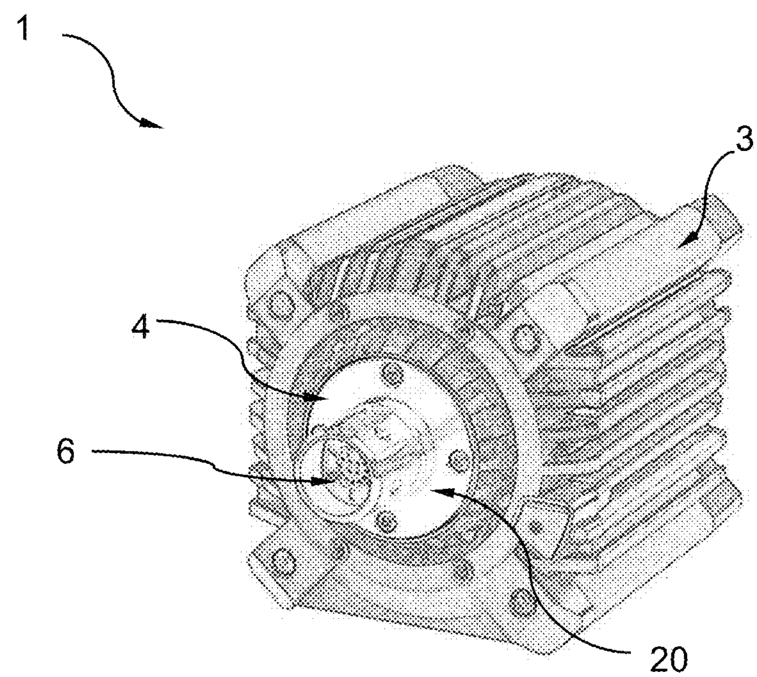
FIG. 3 shows another perspective view on the embodiment of the steering wheel base according to FIG. 1, wherein a first mechanical quick coupling element is coupled to the attachment element.
Figure 4:
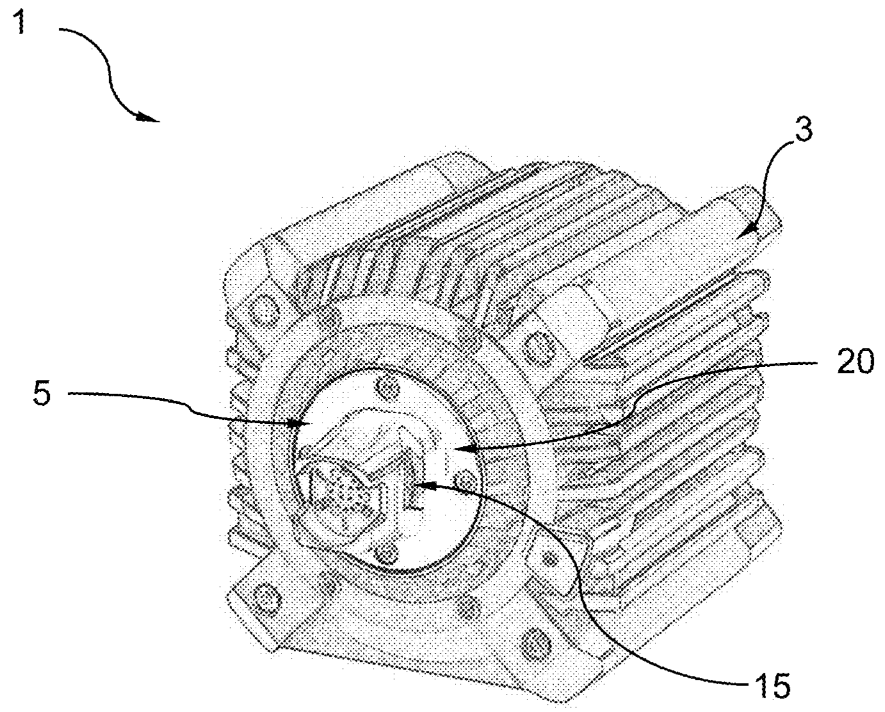
FIG. 4 shows another perspective view on the embodiment of the steering wheel base according to FIG. 1, wherein a second mechanical quick coupling element is coupled to the attachment element.

The figures show an embodiment of a steering wheel base 1 for gaming applications according to the invention. The steering wheel base 1 comprises a steering wheel shaft that is mounted as part of an electrical motor inside a steering wheel base casing 3. The electrical motor is configured to direct simulated forces to the steering wheel shaft and thus to the steering wheel and, at the same time, to read the steering movements of the steering wheel and thus of the steering wheel shaft and to transmit this to the gaming application. As a different embodiment, the steering wheel shaft can also be mounted inside a belt device inside a steering wheel base casing 3.

Further the steering wheel base 1 comprises an attachment component 2 that is fixed to the steering wheel shaft to rotate with the steering wheel shaft. The attachment component 2 comprises a protrusion 9 that extends in the axial direction 10 of the steering wheel shaft. At the end of the protrusion 9 an electric plug-in contact 6 is arranged, which is configured to connect the steering wheel base 1 to the electronics of a steering wheel.

Additionally the steering wheel base 1 comprises a system of a first mechanical quick coupling element 4 and a second mechanical quick coupling element 5, which are interchangeably fixable to the attachment component 2 and which can be used to mechanically fix a steering wheel side quick coupling element of the steering wheel to the steering wheel base 1.

To fix the first mechanical quick coupling element 4 or the second mechanical quick coupling element 5 to the attachment component 2, the first mechanical quick coupling element 4 and the second mechanical quick coupling element 5 each comprise a sleeve part 11 that forms a cavity 12 with a first opening 13 and a second opening 14 that are facing each other. Thereby, the protrusion 9 is insertable into this cavity through the first opening 13, wherein the electric plug-in contact 6 is accessible from the second opening 14.

To define the orientation of the first mechanical quick coupling element 4 and the second mechanical quick coupling element 5 in regard to the attachment component 2, the attachment component 2 comprises a first engagement element 7 and the first mechanical quick coupling element 4 and the second mechanical quick coupling element 5 each comprise a second engagement element 8, wherein the first mechanical quick coupling element 4 and the second mechanical quick coupling element 5 can only be fixed to the attachment component 2, when the second engagement element 8 engages the first engagement element 7. Additionally the outer contour of the electric plug-in contact 6 and the cavity 12 of the second mechanical quick coupling element 5 are formed in such a way that the second mechanical quick coupling element 5 can only be moved on to the protrusion 9 in a specific orientation.

To securely fixate the second mechanically quick coupling element 5 to the attachment component 2, the protrusion 9 comprises two snap-fitting elements 15 on opposite sides of the sheath surface of the protrusion 9 that engage with counterparts at the sleeve part 11 of the second mechanical quick coupling element 5, when the second mechanical quick coupling element 5 is brought into the fixed position in relation to the attachment component 2. To securely fixate the first mechanical quick coupling element 5 to the attachment component 2, the protrusion 9 comprises a threaded hole 16 on the sheath surface of the protrusion 9. When the first mechanical quick coupling element 4 is brought into the fixed position in relation to the attachment component 2, a hole inside the sleeve part 11 of the first mechanical quick coupling element 4 overlaps with the threaded hole 16, such that a screw or a similar fixation element can be screwed into the threaded hole 16 through the sleeve part 11, wherein the first mechanical quick coupling element 4 is thereby fixated to the attachment component 2.

Additionally, the attachment component 2 comprises a first flange disc 19 at an end of the protrusion 9 opposing the end of the protrusion 9 with the electric plug-in contact 6 and the first mechanical quick coupling element 4 and the second mechanically quick coupling element 5 each comprise a second flange disc 20 at the first opening 13 of their respective sleeve part 11. The first flange disc 19 comprises threaded holes 21 and the second flange disc 20 of the respective first mechanical quick coupling element 4 and the second mechanical quick coupling element 5 comprises corresponding holes, such that the first flange disc 19 and the second flange disc 20 can be fixated to each other by screws.

To mechanically quick couple the not shown steering wheel to the steering wheel base 1, the first mechanical quick coupling element 4 and the second mechanical quick coupling element 5 each comprise coupling engagement elements 17. The coupling engagement elements 17 of the first mechanical quick coupling element 4 are formed as indentations on the sheath surface of the sleeve part 11 of first mechanical quick coupling element 4. The coupling engagement element 17 of the second mechanical quick coupling element 5 are formed as two slots opposing each other on the sheath surface of the sleeve part 11 of the second mechanical quick coupling element 5. These slots are configured as openings into the cavity 12 of the second mechanical quick coupling element 5 and are also used as counterpart of the snap-fitting elements 15. To guarantee the right orientation of the steering wheel in relation to the steering wheel shaft, the sleeve part 11 of the first mechanical quick coupling element 4 comprises a groove 18 on its sheath surface extending in axial direction 10, wherein the steering wheel side quick coupling element corresponding to the first mechanical quick coupling element 4 comprises a tongue that engages with the groove 18, when the steering wheel is coupled to the steering wheel base 1. The outer contour of the sleeve part 11 of the second mechanically quick coupling element 4 on the other hand is formed such that the corresponding steering wheel site coupling element can only be coupled to the second mechanical quick coupling element 4 in a specified direction.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE SIGNS

1 Steering wheel base
2 Attachment component
3 Steering wheel base casing
4 First mechanical quick coupling element
5 Second mechanical quick coupling element
6 Electric plug-in contact
7 First engagement element
8 Second engagement element
9 Protrusion
10 Axial direction
11 Sleeve part
12 Cavity
13 First opening
14 Second opening
15 Snap-fitting element
16 Threaded hole
17 Coupling engagement element
18 Groove
19 First flange disc
20 Second flange disc
21 Threaded holes
22 Corresponding holes

The invention claimed is:

1. A steering wheel base for gaming applications comprising:

a steering wheel shaft;

an attachment component, which is fixed to the steering wheel shaft to rotate with the steering wheel shaft and that is configured such that the steering wheel base is directly electrically connectable to electronics of a steering wheel via an electric plug-in contact of the attachment component; and a system comprising a first mechanical quick coupling element and a second mechanical quick coupling element, wherein the first mechanical quick coupling element and the second mechanical quick coupling element are interchangeably fixable to the attachment component into a fixed position and are adapted for different steering wheel side coupling elements of the steering wheel to provide mechanical quick coupling between the steering wheel base and the steering wheel.

2. The steering wheel base of claim 1, wherein the attachment component comprises a first engagement element; and the first mechanical quick coupling element and the second mechanical quick coupling element each comprise a second engagement element, wherein the first mechanical quick coupling element and the second mechanical quick coupling element are only fixable to the attachment component in the fixed position, when the first engagement element engages the second engagement element.

3. The steering wheel base of claim 1, wherein the attachment component comprises a protrusion, which extents in line with an axial direction of the steering wheel shaft, wherein the electric plug-in contact is arranged at an end of the protrusion distant to the steering wheel shaft and a contact closure direction of the electric plug-in contact is in line with the axial direction of the steering wheel shaft.

4. The steering wheel base of claim 3, wherein the first mechanical quick coupling element and the second mechanical quick coupling element each comprise a sleeve part forming a cavity having two opposite openings, a first opening and a second opening, wherein the protrusion of the attachment component is configured such that the protrusion is insertable into the cavity through the first opening and wherein the electric plug-in contact is accessible from the second opening to electrically connect the electronics of the steering wheel to the electric plug-in contact, wherein preferably the cavities of the respective mechanical quick coupling element are shaped differently.

5. The steering wheel base of claim 4, wherein the sleeve part of the respective first mechanical quick coupling element and the second mechanical quick coupling element is configured such that the electronics of the steering wheel are aligned with respect to the electric plug-in contact of the attachment component by the geometry of sleeve part of the first mechanical quick coupling element and the second mechanical quick coupling element, when the steering wheel with its respective steering wheel side coupling element is moved onto the first mechanical quick coupling element or the second mechanical quick coupling element to couple the steering wheel to the steering wheel base.

6. The steering wheel base of claim 4, wherein the outer periphery of a portion of the protrusion is shaped such that the first mechanical quick coupling element and/or the second mechanical quick coupling element can be inserted onto the protrusion only in a specific orientation.

7. The steering wheel base of claim 4, wherein the protrusion comprises at least one snap-fitting element, preferably two at opposite positions, at its sheath surface, which is configured to engage with a counterpart on the sleeve part of the first mechanical quick coupling element and/or the second mechanical quick coupling element.

8. The steering wheel base of claim 4, wherein the protrusion comprises a threaded hole in its sheet at its sheath surface, which is configured such that a fastener is screwable into the threaded hole through an opening leading into the cavity in an outer wall of the first mechanical quick coupling element and/or the second mechanical quick coupling element to secure the first mechanical quick coupling element and/or the second mechanical quick coupling element in the fixed position in a specific orientation.

9. The steering wheel base of claim 4, wherein the first mechanical quick coupling element and the second mechanical quick coupling element each comprise coupling engagement element is on an outside of the sleeve part that serve to mechanically quick couple the steering wheel side coupling elements of the steering wheel to the steering wheel base.

10. The steering wheel base of claim 4, wherein the sleeve part of the respective first mechanical quick coupling element and second mechanical quick coupling element is configured such that the steering wheel side coupling element of the steering wheel is only couplable to the steering wheel base in a defined orientation.

11. The steering wheel base of claim 1, wherein the attachment component comprises a first flange disc, which is arranged symmetrically around and at an end of the protrusion, and the first mechanical quick coupling element and the second mechanical quick coupling element each comprise a second flange disc, which is arranged symmetrically around and at an end of the sleeve part of the first mechanical quick coupling element and the second mechanical quick coupling element, wherein the first flange disc and second flange disc are configured such that the two flange discs are connectable by screws, wherein the first flange disc comprises threaded holes and second flange disc comprises corresponding holes such that the second flange disc is fixable to the first flange disc by screws that are inserted through the corresponding holes and screwed into the threaded holes.

12. The steering wheel base of claim 1, embodied in a steering wheel system further comprising a steering wheel with a steering wheel side coupling element, wherein a fitting mechanical quick coupling element of the system of the first mechanical quick coupling element and the second mechanical quick coupling element in regard to the steering wheel side coupling element is fixed to the attachment component and the steering wheel is mechanically quick coupled to the steering wheel base.

* * * * *